United States Patent
Bauer

[11] Patent Number: 5,275,205
[45] Date of Patent: Jan. 4, 1994

[54] VALVE CONTAINING COUPLED, ROTATABLE ELEMENTS TO CONTROL FLUID FLOW THERETHROUGH

[75] Inventor: Friedrich Bauer, Vienna, Austria

[73] Assignee: Hoerbiger Fluidtechnik GmbH, Fed. Rep. of Germany

[21] Appl. No.: 836,372

[22] Filed: Feb. 18, 1992

[30] Foreign Application Priority Data

Feb. 19, 1991 [AT] Austria .................................. 341/91

[51] Int. Cl.$^5$ ...................... F15B 13/044; F16K 31/02
[52] U.S. Cl. ................... 137/596; 251/129.06; 418/181
[58] Field of Search .............. 251/129.06; 418/181, 418/206; 137/596, 802

[56] References Cited

U.S. PATENT DOCUMENTS

| | | | |
|---|---|---|---|
| 1,689,791 | 10/1928 | McClatchie | 418/206 |
| 1,743,582 | 1/1930 | Wiltse | 418/206 X |
| 3,746,049 | 7/1973 | O'Connor | 137/802 |
| 4,682,939 | 7/1987 | Petro . | |
| 4,981,423 | 1/1991 | Bissonnette . | |

FOREIGN PATENT DOCUMENTS

| | | |
|---|---|---|
| 0281654 | 9/1988 | European Pat. Off. . |
| 0308827 | 3/1989 | European Pat. Off. . |
| 2637321 | 2/1977 | Fed. Rep. of Germany . |
| 3045192 | 6/1982 | Fed. Rep. of Germany ...... 418/206 |
| 3324775 | 1/1984 | Fed. Rep. of Germany . |

OTHER PUBLICATIONS

PCT Publication No. WO81/01315 published May 14, 1981.
Patent Abstracts of Japan, vol. 9, No. 256, 1979 (60-104819).

*Primary Examiner*—Gerald A. Michalsky
*Attorney, Agent, or Firm*—Watson, Cole, Grindle & Watson

[57] ABSTRACT

In a piezoelectric valve the actual control member (7) is formed by a displacer fluid motor (9) though which the fluid stream (5) flows. A piezoelectric actuating element (8) is disposed in the region of a displacer element (1), which can be moved by the fluid stream (5) and belongs to this fluid motor (9), and acts exploiting the inverse piezo effect during electric actuation to at least indirectly block or release this displacer element (1). The fluid motor (9) is formed preferably by a rotating piston machine, such as a gear pump.

9 Claims, 2 Drawing Sheets

VALVE CONTAINING COUPLED, ROTATABLE ELEMENTS TO CONTROL FLUID FLOW THERETHROUGH

BACKGROUND OF THE INVENTION

The invention relates to a valve to shut off or control a fluid stream, with a housing exhibiting one inlet and one outlet each for the fluid stream to be controlled, a control member disposed between the inlet and outlet, and an actuating element for the control member.

Especially in recent years valves have been known that allow, for example, a control member for a fluid stream to be influenced in accordance with an applied voltage while utilizing the inverse piezo effect. The inverse piezo effect has the advantage of being able to make do with only a small amount of electric energy in order to actuate the control member, but is accompanied by the drawback that only relatively small deformations or adjusting paths are possible. In order to take this circumstance into consideration, either lever transmissions or the like are to be provided, in order to increase sufficiently the range of change in the cross sections to be controlled—a feature that makes the valves complicated and susceptible—or the valve is to be designed and applied from the beginning only as a pilot valve for small cross sections or fluid mass flow. Similar advantages and disadvantages are also to be expected, for example, when actuating the control member by means of other suitable actuating elements, which utilize the thermal expansion (bimetals or the like) or the socalled shape memory (memory metals).

The object of the present invention is to design a valve of the aforementioned kind in such a manner that while retaining the advantages of the simple actuation or control, the aforementioned drawbacks are avoided and that also a relatively large fluid mass flow can be controlled with minimum complexity in design.

SUMMARY OF THE INVENTION

This goal is achieved according to the invention in that the control member is in the form of a displacer-fluid motor through which the fluid stream flows, and that the actuating element is disposed in the region of a displacer element, which is moveable by the fluid stream and belongs to this fluid motor, and, when actuated, blocks or releases at least indirectly this displacer element.

In place of the aforementioned lever transmissions or the like, which are difficult to adjust and have a complicated design, in order to increase the control range, for example, of a piezoelectric actuating element, a specific design of the control member, or the tuned effect of the actuating element on this control member, the valve design is now adapted here directly to the specified small range of motion or adjustment of the piezo element in the actuating element. The expansion or contraction of the actual piezo element (or bimetal or memory metal element) is used to clamp or release a displacer element that is normally moved while the fluid flows through. If the movement of the fluid motor, working according to the displacer principle, is blocked in this manner, a valve is obtained that admits a quantity of fluid that corresponds to the motor consumption (absorption quantity, throughput quantity), while the fluid motor is running, and, when the motor is blocked, said valve closes more or less sealingly depending on the construction. Since it is not the task of this fluid motor to deliver mechanical power, the actually used principle of the fluid motor is not selected with respect to the efficiency, but rather with respect to simplicity, motor consumption, sealing in the blocked state, etc. Apart from all possible kinds of air, gas, liquid or oil motors, steam engines, which are operated with compressed air and whose piston, flywheel, or the like is decelerated by the actuating element, can also be used, for example, within the scope of the invention.

In this connection another embodiment of the invention is especially advantageous, according to which the fluid motor is formed by a rotating piston machine, preferably according to the principle of a gear pump or a Roots blower. Such rotating piston machines are to be manufactured with rather low friction and sealingly without any special complexity in design and with very low maintenance during service. At least the displacer element of the fluid motor in another embodiment of the invention can be designed as a mass precision part, in particular made of ceramic, a feature that renders the valve in total simple, maintenance free and inexpensive.

The precision that is necessary when changing between off-load voltage and operating voltage owing to the aforementioned, negligible linear expansion, for example, of the actual piezo element can be achieved according to another preferred embodiment of the invention in that the displacer element or the rotary piston and/or the housing of the fluid motor is assembled of flat disks, whose outer periphery is machined, preferably ground or lapped, together.

According to another embodiment of the invention, the actuating element can be off-centered relative to the axis of the rotary piston, a feature that enables, for example, arrangements analogous to the known disk brake.

According to another embodiment of the invention the actuating element can, however, also be centered relative to the axis of the rotary piston and be designed preferably as a sleeve or chamfered shaft. Thus, the rotary piston, an axis of the rotary piston, a bearing or the like can be adjusted in the axial direction; and one of the parts can be clamped, for example, sideways to a part, which is stationary in the housing, in order to block the displacer element.

According to another preferred embodiment of the invention, the actuating element can also exhibit several separately arranged, individual elements, where their arrangement and effect on the enabling or blocking of the throughflow of the control member varies widely and can be adjusted to the respective requirements.

In another embodiment of the invention the actuating elements of two fluid motors arranged in succession in the flow direction of the fluid stream can be driven together diametrically opposite, so that one is free, while the other is blocked and vice versa. Thus a 3-way valve is provided by the simplest method.

In the latter connection an especially preferred embodiment of the invention provides that the two fluid motors are arranged spacially side-by-side and that a common actuating element is provided to have a diametrically opposing effect on both fluid motors. Thus, the actuating element, which blocks the one fluid motor, can release simultaneously the other, a feature that further simplifies the total design of such a valve.

The invention is explained in detail in the following with the aid of the embodiments shown schematically in the drawing.

DETAILED DESCRIPTION OF THE PREFERRED EMBODIMENTS

Figure 1:
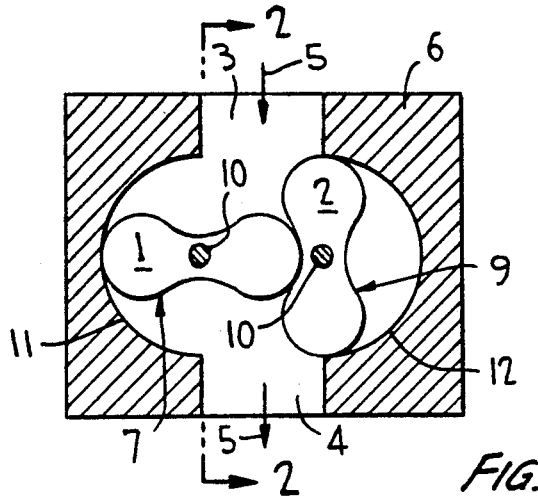
FIG. 1 is a cross sectional view of a valve according to the invention.
Figure 2:
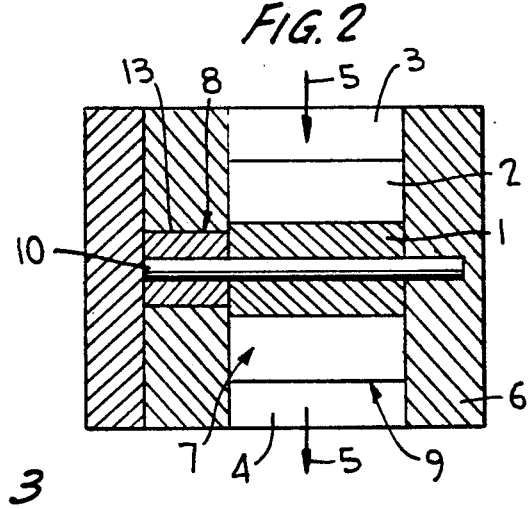
FIG. 2 is a cross sectional view along line 2—2 in FIG. 1.

The valve, which is shown only as a schematic drawing in FIGS. 1 and 2 and serves to shut off or control a fluid stream, comprises substantially a housing 6, exhibiting one inlet and one outlet 3, 4 each for the fluid stream to be controlled (indicated by arrow 5), a control member 7 disposed between inlet and outlet 3, 4, and a piezoelectric actuating element 8 for the control member 7. The control member 7 is in the form of a displacer fluid motor 9, through which the fluid stream 5 flows and which is formed here by a Roots blower.

The Roots blower of the fluid motor 9 comprises substantially two displacer elements 1, 2, which are coupled in their rotary motion in a manner not shown here and which can be rotated around axes 10 in housing 6 and interact with recesses 11, 12 in housing 6.

The actuating element 8, which contains here at least one piezo element reacting as a consequence of the inverse piezo effect on the voltage changes, is disposed in the region of one (here 1) of the displacer elements, which can be moved by the fluid steam (5), in a bore 13 enlarged around the axis 10 and serves to block or release the unrestricted rotatability of the displacer element 1 and thus the entire fluid motor 9 during electric actuation. Thus, for example when voltage is applied to the actuating element 8 (the electrical contacting and the related lines are not shown), axis 10 is clamped so as to be frictionally engaged. The frictional force also depends on the surface finish (roughness) of all of the interacting surfaces of the friction partner. Nevertheless, a totally or partially shape-locking attachment to the surface provided, for example, with grooves or flutes would also be possible, of course.

For running fluid motors an amount of fluid matching the so-called motor consumption is admitted, whereas, when the fluid motor is blocked, this throughflow is cut off more or less sealingly. With respect to simplicity, motor consumption, sealing in the blocked state, etc., nearly any arbitrary variation of the fluid motor, which is shown as a rotating piston machine, and here in particular as a Roots blower, can also be used, of course.

Figure 5:
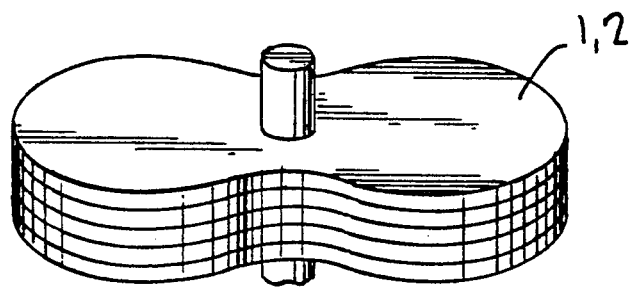
FIG. 5 is a perspective view of an embodiment of the displacer elements which can be used in the inventive valve.

The two displacer elements 1, 2 or also housing 6 can be made, as mass precision parts, in particular of ceramic, for reasons relating to sealing and/or cost, whereby a sandwich design comprising flat disks can also be used (see FIG. 5); in this design the outer periphery or sealing surfaces of the individual parts for each layer can be machined, preferably ground or lapped, together.

As a variation of the illustrated design of the arrangement of the actuating element B as sleeve around the axis to be clamped in order to fix in position the fluid motor, a kind of brake disk, for example, could also be attached to this axis, on which the actuating element, which is off-centered relative to the axis of the rotary piston, acts, as necessary. In so doing, several individual piezo elements could also be used in varying angular positions or also on several such disks or the like.

Figure 3:
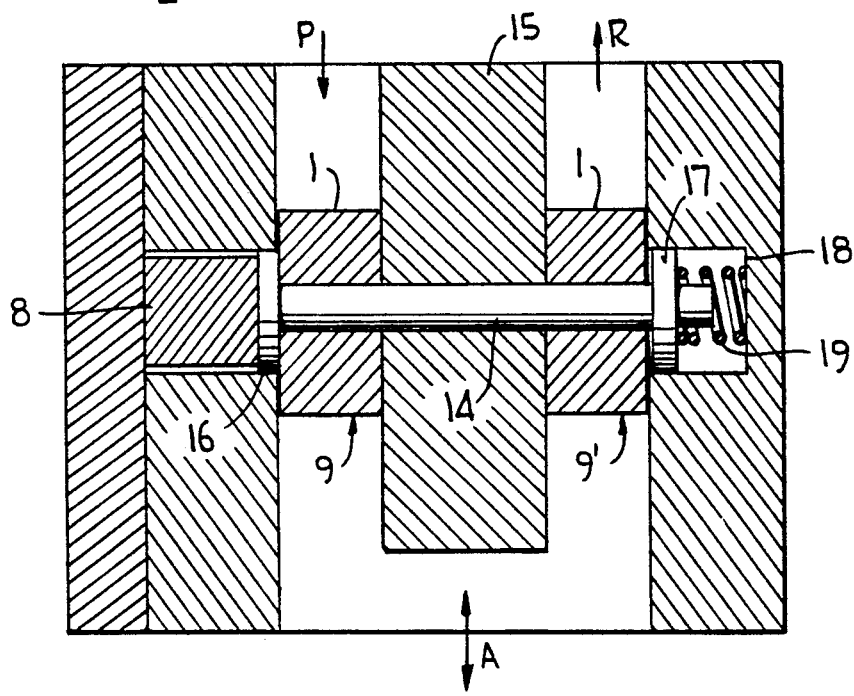
FIG. 3 and FIG. 4 are each a cross sectional views of another embodiment.

In the valve shown only in part and as a schematic drawing in FIG. 3, two fluid motors 9, 9' are arranged spacially side by side in a design corresponding in principle, for example, to the design according to FIGS. 1 and 2, where here now a common actuating element B is provided in order to have a diametrically opposing affect on the two fluid motors 9, 9'. For this purpose the displacer elements 1 are disposed on a common axis 14, which perforates a housing section 15 and whose two ends exhibit shoulders 16. On the left side the axis 14 can be driven with force by means of the expansion of shoulder 16 by the actuating element B when applying a voltage and can be moved slightly to the right against the force of a spring 19 arranged in a recess 18. Axis 14 and the displacer elements 1 arranged thereon can be reset to the left via the shoulder member 17 or the spring 19 acting thereon.

In the right final position shown in FIG. 3, the left fluid motor 9 is blocked by means of the displacer element 1 abutting the housing section 15—the right fluid motor 9' is free, resulting is the possibility of a return flow from connection A to connection R; and connection P is blocked. In the other left final position (not illustrated) the feed P to connection A is free and the return flow R is blocked. Thus, it involves a 3/2-way valve, which is operated piezoelectrically without a pilot valve and can also be used definitely for larger fluid streams.

Also with respect to FIG. 3 it is in turn pointed out that various different arrangements or designs of both the actuating element and the fluid motors are possible.

Figure 4:
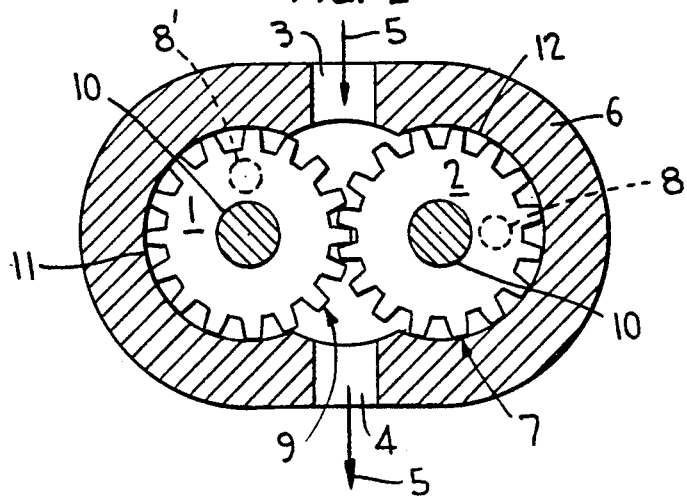

Finally FIG. 4 shows in a drawing corresponding to that of FIG. 1 is a preferred design of the valve according to the invention with a fluid motor 9 designed as a gear pump. The two displacer elements 1 and 2 are here gear wheels, which can be rotated freely on axes 10. The piezoelectric actuating element 8 is off-centered relative to the displacer element 2 in housing 6, as indicated by the dashed line in the drawing, and acts on the displacer element 2 in order to block it. The actuating element 8 can include a separately arranged piezoelectric element 8' which acts on the displacer element 1 and is off-centered relative thereto. It should be noted that the displacer element(s) in this embodiment can also be designed and arranged analogous to FIGS. 2 and 3.

I claim:

1. A valve which comprises a housing that defines an inlet port, an outlet port and a channel which extends from said inlet port to said outlet port; a first control device located in said channel which comprises first and second coupled, rotatable elements that are rotatable by a fluid passing through said channel and, when allowed to mutually rotate, will allow said fluid to flow therepast, and when prevented from rotating, will prevent said fluid from flowing therepast; and an electrically-operated piezoelectric actuating element connected to said first rotatable element to control whether said first and second rotatable elements can rotate.

2. A valve as claimed in claim 1, wherein said actuating element is off-centered relative to an axis of said one rotatable element to which it is connected.

3. A valve as claimed in claim 1, wherein said actuating element comprises several separately arranged piezoelectric elements.

4. A valve as claimed in claim 1, including a second control device located in said housing and including third and fourth coupled, rotatable elements that are rotatable by a fluid passing therepast and when allowed to mutually rotate, will allow fluid to flow therepast, and when prevented from rotating, will prevent fluid from flowing therepast.

5. A valve as claimed in claim 4, wherein said first and second control devices are arranged spacially side-by-side and wherein said third rotatable element is connected to said electrically-operated piezoelectric actuating element such that said actuating element controls whether said third and fourth rotatable elements can rotate.

6. A valve as claimed in claim 1, wherein each of said first and second rotatable elements is made of ceramic.

7. A valve as claimed in claim 1, wherein each of said first and second rotatable elements is composed of a plurality of flat disks.

8. A valve as claimed in claim 1, wherein said first rotatable element rotates around a first axis, said second rotatable element rotates around a second axis, and wherein said actuating element is aligned with one of said first and second axis.

9. A valve as claimed in claim 8, wherein said actuating element is formed as a sleeve that extends within said housing.

* * * * *